(12) United States Patent
Joshi (10) Patent No.: US 10,339,490 B1
(45) Date of Patent: Jul. 2, 2019

(54) DYNAMICALLY GENERATING ORIENTATION INFORMATION FOR CONTAINERS

(75) Inventor: Siddharth Vivek Joshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1596 days.

(21) Appl. No.: 13/591,705

(22) Filed: Aug. 22, 2012

(51) Int. Cl.
*G06Q 10/08* (2012.01)
(52) U.S. Cl.
CPC ................ *G06Q 10/0832* (2013.01)
(58) Field of Classification Search
CPC ................................ G06Q 10/0832
See application file for complete search history.

(56) References Cited

U.S. PATENT DOCUMENTS

| | | | | |
|---|---|---|---|---|
| 3,701,282 | A * | 10/1972 | Peterson | G01K 11/06 116/21 |
| 3,958,688 | A * | 5/1976 | Sterling | 198/416 |
| 6,381,981 | B1 * | 5/2002 | Yaddgo et al. | 62/372 |
| 2004/0054549 | A1 * | 3/2004 | Chittenden et al. | 705/1 |
| 2005/0171738 | A1 * | 8/2005 | Kadaba | 702/187 |
| 2007/0012602 | A1 * | 1/2007 | Baldassari et al. | 209/583 |
| 2008/0120201 | A1 * | 5/2008 | Velazquez et al. | 705/28 |
| 2011/0005967 | A1 * | 1/2011 | Gregerson | H01L 21/67383 206/711 |

OTHER PUBLICATIONS

Hurley, Rupert Andrew, The Design of a Data Recorder to Test the Effects of Color Contrast on "This Side Up" Pictorial Markings on Package Orientation Within UPS Ground, Clemson University, Aug. 2008.*

* cited by examiner

*Primary Examiner* — Nathan Erb
(74) *Attorney, Agent, or Firm* — Athorus, PLLC (57) ABSTRACT

Where a particular item has certain restrictions or requirements which should be followed when the item is stored or transported, a transit plan or storage plan for the item may be developed using the systems and methods of the present disclosure. In particular, where the restrictions or requirements may change over time (i.e., during the period in which the item is stored or transported), the transit plan or storage plan may include accommodations for changing the conditions of the item in order to comply with the restrictions or requirements. In particular, the transit plan or storage plan may call for the reorientation of an item that has orientation-specific requirements as the item is in storage or in transit.

23 Claims, 9 Drawing Sheets

DYNAMICALLY GENERATING ORIENTATION INFORMATION FOR CONTAINERS

BACKGROUND

Today's electronic commerce systems and methods now have the capacity to pair consumers with products that may be located in virtually every corner of the globe. Consumers may now visit an online marketplace to order one or more items (e.g., goods, products, services, information or media of any type or form) from nearly any location on the planet, and have the items delivered to their doorsteps. Once a source for the one or more items has been identified, and an order of the items has been confirmed, the items will be delivered from the source to the customer in one or more intermodal segments, such as in the air, on land and sea.

Many items that may be ordered online require particular handling conditions during storage or transit. For example, containers that are used to store or deliver delicate items or items that must remain in a particular orientation are often marked with static labels such as "FRAGILE" or "THIS END UP," respectively. Such labels or markings notify handlers of the containers that the items may be damaged or destroyed if particular handling conditions, such as a maximum amount or extent of vibration, or a specific alignment or orientation, are not maintained.

The risk of damaging items in storage or in transit is particularly acute for perishable goods, many of which will degrade in quality if certain handling conditions are not maintained. For example, many fruits and vegetables (such as mangoes) will develop bruises or discoloration if they are not rotated from time to time, and many food products that contain solutions, colloids or suspensions should also be occasionally rotated. Similarly, even when such an item is stationary, changing a particular environmental condition of the item while it is stored in a warehouse or other storage facility may extend the item's shelf life and maintain its quality until the item is ultimately delivered to its final destination.

However, existing systems and methods for advising handlers as to preferred or mandatory environmental conditions for items in storage or in transit, including labels such as "FRAGILE" or "THIS END UP," are insufficient in situations in which such environmental conditions may change from time to time.

Therefore, systems and methods for determining preferred or essential environmental conditions of items in storage or in transit, monitoring the conditions of such items, and changing the conditions of such items as needed may be particularly beneficial when integrated with existing systems and methods for storing or shipping items.

DETAILED DESCRIPTION

As is set forth in greater detail below, the present disclosure is directed to systems and methods for dynamically generating orientation information for containers. Specifically, the present disclosure describes system and methods for identifying the preferred or essential conditions of one or more items while in storage or in transit; monitoring the particular environmental conditions of a container or other vessel holding such items; and modifying the environmental conditions of the container or vessel, as necessary, to optimize the state and/or maximize the quality of the items upon their delivery to a recipient. Preferably, some environmental conditions that may be monitored and optimized in accordance with the systems and methods of the present disclosure include the alignment and/or positioning of the items, i.e., the locations and/or orientations of containers holding such items with respect to one or more axes and/or points in three-dimensional space. Other conditions that may be monitored or optimized include, but are not limited to, the temperature, pressure, altitude or humidity of the items; the velocity or acceleration of the items; and/or any vibrations or other forces (e.g., centripetal forces or centrifugal forces) to which the items may be subjected while in storage or in transit.

In accordance with the systems and methods of the present disclosure, environmental conditions of a container or vessel holding one or more items may be monitored using any types of sensors or sensing technology known to those of ordinary skill in the art, including but not limited to gyroscopes, accelerometers, thermometers, barometers, manometers, altimeters, psychrometers, hygrometers, speedometers or any other devices, or combinations of one or more such devices. Such environmental conditions may be monitored continuously or at specific points in time, i.e., upon the arrival and/or registration of an item at a particular waypoint. The sensors or sensing technology may be applied or fixed to a container or vessel holding such items, or installed on one or more vehicles containing such a container or vessel. The conditions sensed by such sensors or sensing technology may thus be imputed to the container or vessel and, therefore, to the items maintained within the container or vessel.

According to one embodiment of the present disclosure, a consumer orders a bushel of an exotic perishable food product that is native to a tropical location from an online marketplace over the Internet. To maintain its freshness, the food product should be rotated from time to time. In order to deliver the food product from the tropical location to the consumer's home, a container including the food product must be transported by car from the tropical location to a first transfer station, then in an airplane traveling from the first transfer station to a second transfer station, then by ship from the second transfer station to a third transfer station, and finally by truck from the third transfer station to the consumer's home. For tracking purposes, the container may include one or more markings, such as a bar code (which may be a one-dimensional or a two-dimensional bar code, sometimes called a "Quick Response" code, or QR code) or other optically readable marking, that may be read or interpreted in order to register the container upon its arrival at a location.

Once the food product has been packed into the container, a transit plan that ensures that the container will be rotated at a series of regular, controlled intervals may be developed using a tracking and monitoring system according to the present disclosure. According to the transit plan, the container may be registered at the tropical location by scanning a bar code or other optically readable marking on the container using a bar code reader or other type of device, and positioned in a first orientation in the car. Then, once the car arrives at the first transfer station, the container may be registered again before being repositioned to a second orientation (e.g., rotated) and placed onto the airplane. Once the airplane lands at the second transfer station, the container may be registered and repositioned to a third orientation (e.g., rotated again) before being loaded onto the ship. Once the ship arrives at the third transfer station, the container may be registered and repositioned to a fourth orientation (e.g., rotated again) before being loaded onto the truck. By the time the truck reaches the consumer's home, the food product will arrive in a fresher condition than if the container had not been rotated at all, based on the several, controlled rotations that were provided to the container throughout its delivery, as specified in the transit plan.

According to another embodiment of the present disclosure, a shipment of cargo is to be delivered from an origin to a destination through several intervening waypoints. In order to maintain the quality of the cargo throughout the delivery, a series of logistic restrictions relating to the condition of the cargo must be followed. A sensor for monitoring the environmental conditions of the cargo with respect to the logistic restrictions is mounted to the cargo throughout its delivery. For example, the sensor may include a gyroscope to measure the angular orientation of the cargo, while an accelerometer may sense acceleration levels of the cargo, and a thermometer may monitor the temperature of the cargo, during shipment. If a threshold relating to one of the logistic restrictions is approached or exceeded during the delivery, the sensor may transmit an alarm and/or deliver an electronic signal to one or more devices within the vicinity indicating that the one or more of the logistic restrictions must be addressed. For example, where a container holding the cargo is being transported to a location by car, and the container has been positioned on one side for a predetermined time limit, an alarm may sound on the car's dashboard or on a device accompanying the driver, who may exit the vehicle and reposition the container within the car. Alternatively, if a temperature of the container exceeds a predetermined set point, the driver may elect to turn on air conditioning to provide cooling to the container, or such air conditioning may be provided automatically. By monitoring the conditions of the container en route with respect to any relevant logistic restrictions, the systems and methods of the present disclosure may ensure that the quality of the cargo is maximized upon its arrival at the destination.

According to yet another embodiment of the present disclosure, a variety of items are stored at a warehouse prior to their delivery to a customer. Once the items have arrived at the warehouse, they may be registered in a computer system, which determines whether the items have any particular storage criteria relating to conditions that must be periodically altered, such as a maximum length of time at which the items may be positioned in a particular orientation, or a maximum temperature at which the items may be maintained. Various types of computer systems may be used to monitor the items with respect to the storage criteria. For example, the computer system may include a single, fixed computer having information regarding each of the items stored on one or more computer-readable media (e.g., a table stored in a database), as well as systems for informing an authorized user when an environmental condition of one or more of the items must be addressed and/or modified. Alternatively, the computer system may also include one or more sensors mounted to each of the items and/or their respective containers, wherein the sensors are able to sense or detect data pertaining to the storage criteria. When a threshold relating to a storage criterion of one or more items is approached or reached, the computer system may alert one or more authorized users that the items' conditions must be addressed and/or modified. Accordingly, the systems and methods of the present disclosure may be used to create a dynamic, interactive storage facility for items that may ensure that the proper conditions of the items are maintained, in order to maximize the quality of the items prior to their delivery to the customer.

Therefore, in accordance with embodiments of the present disclosure, systems and methods for storing or delivering items having particular dynamic environmental or logistic restrictions associated therewith (e.g., dynamic requirements pertaining to the orientation or alignment of the goods, or the temperature or pressure of the goods) may identify any such restrictions, develop plans for maintaining and/or monitoring the states of such items in storage or in transit, and change the conditions of such items with respect to such restrictions, as necessary, to maximize their quality upon their arrival at their destinations. Any pertinent information regarding the condition of the one or more items in storage or in transit with respect to such restrictions may be displayed in one or more user interfaces. For example, a user interface may display the status or relevant information for each of the items and/or containers in a particular vehicle (e.g., a truck or cargo ship), or the items and/or containers in a fleet of such vehicles, or among a system for delivering items and/or containers. Such information may include the current status of the items and/or containers, the length of time since the conditions of the respective items and/or containers were last modified, the time at which the status of the items and/or containers must be addressed again in the future, or any other pertinent information. Such information may further include summaries of data or other metrics regarding the delivery of items with respect to transit plans, such as the number of items that have been delivered in accordance with designated transit plan, or in compliance with one or more particular dynamic environmental or logistic restrictions, over a period of time. Moreover, upon the items' arrival at their destinations, records regarding the observed conditions of the items in storage or in transit may be generated and stored in a database or data store and used for any purpose, such as to estimate the quality of the items upon their arrival, or to verify the validity of "sell by" dates or other indicia of the items' shelf lives.

Figure 1:
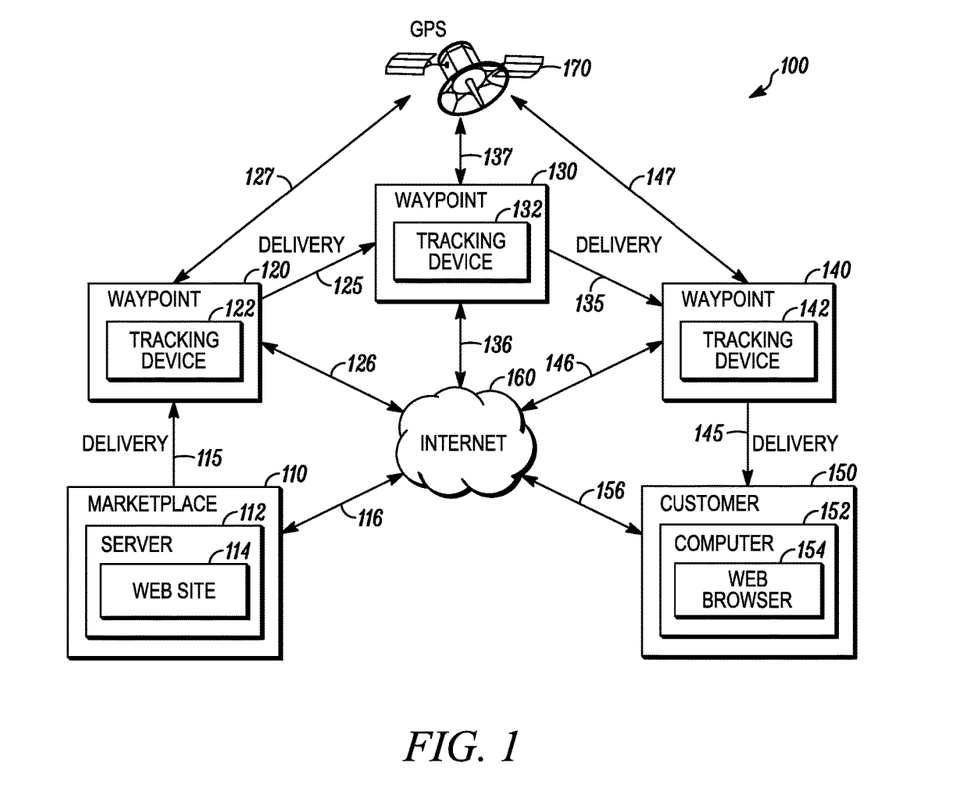
FIG. 1 is a block diagram of components a method and system for dynamically generating orientation information for containers, in accordance with embodiments of the present disclosure.

Referring to FIG. 1, the various components of an embodiment of an interactive system 100 that may be utilized in accordance with the present disclosure are shown. The system 100 includes an electronic commerce or Internet-based marketplace (or supplier, retailer, seller, reseller or distributor) 110, a plurality of intervening waypoints 120, 130, 140, and a customer 150 (or user, consumer, client, shopper or buyer).

The marketplace 110 may be any entity that sells or otherwise makes items available for purchase, rent, lease or borrowing by customers, such as the customer 150, from a marketplace web site 114 which may be implemented using one or more physical computer servers 112. The items made available at the marketplace 110 may be obtained from one or more third party vendors, merchants or manufacturers (not shown), and the marketplace 110 itself may be a vendor, a merchant or a manufacturer.

The intervening waypoints 120, 130, 140 may be any physical locations through which one or more items may pass as the items are delivered from the marketplace 110 to the customer 150. The waypoints 120, 130, 140 may include or feature any infrastructure that may be associated with or required for the receipt and delivery of items, such as storage facilities, transportation facilities and/or any related computing systems. As is shown in FIG. 1, each of the waypoints 120, 130, 140 may have at least one tracking device 122, 132, 142 associated therewith. The tracking devices 122, 132, 142 may be utilized to monitor the arrival or departure of items at the intervening waypoints 120, 130, 140, to determine the current status of such items, or to obtain any information regarding such items, and may include one or more user interfaces or other applications for communicating with the marketplace 110 and/or the customer 150, or other waypoints and/or tracking devices.

The waypoints 120, 130, 140 may be connected to or otherwise communicate with the marketplace 110 and/or the customer 150 through a communications network 160, such as the Internet, as indicated by lines 126, 136, 146, by sending and receiving digital data over the network 160. The web browser 154 provides one or more user interfaces for the customer to view and/or communicate with the marketplace web site 114. As is also shown in FIG. 1, each of the waypoints 120, 130, 140 may also be connected to or synchronized with a positioning system, such as the Global Positioning System (GPS) 170, with which information regarding a position of the waypoints 120, 130, 140 and/or the tracking devices 122, 132, 142 may be communicated, as is indicated by lines 127, 137, 147.

The customer 150 can be any entity or individual that wishes to purchase, rent, lease, borrow, or otherwise obtain items (which may include, but are not limited to, goods, products, services, information or media of any type or form) from the marketplace 110 using a client application running on a computer 152, such as a web browser 154. The computer 152 is connected to or otherwise communicates with the marketplace 110 or the waypoints 120, 130, 140 through a communications network 160, such as the Internet, as indicated by line 156, by sending and receiving digital data over the network 160. The web browser 154 provides one or more user interfaces for the customer to view and/or communicate with the marketplace web site 114 and/or the waypoints 120, 130, 140. Also, those of skill in the pertinent art will recognize that the customer 150 may use a keyboard, keypad, mouse, stylus, touch screen, or other device (not shown) or method for interacting with the computer 152 and/or web browser 154, or to "select" an item, link, node, hub or any other aspect of the present disclosure.

The marketplace 110, the waypoints 120, 130, 140 and the customer 150 may include any related transportation facilities for the storage or delivery of items. For example, the marketplace 110 may include one or more warehouses, bus or rail stations, ports, depots or loading and unloading facilities, an airfield or any other like facility for transporting items. Likewise, the waypoints 120, 130, 140 may, for example, be or include any such facilities, either in whole or in part. The customer 150 may include, for example, any driveways, elevators, routes or other like facilities for receiving items. As is also shown in FIG. 1, one or more items may be delivered from the marketplace 110 to the customer 150 through the intervening waypoints 120, 130, 140. For example, an item may be delivered from the marketplace 110 to the waypoint 120, as indicated by line 115. The item may then be delivered from the waypoint 120 to the waypoint 130, as indicated by line 125, and from the waypoint 130 to the waypoint 140, as indicated by line 135. Finally, the item may be delivered from the waypoint 140 to the customer 150, as indicated by line 145. Although the system 100 shown in FIG. 1 includes three intervening waypoints 120, 130, 140, those of ordinary skill in the art would realize that the systems and methods of the present disclosure do not require any particular number of waypoints, and may be utilized without any waypoints at all. Moreover, those of ordinary skill in the art would also realize that the systems and methods of the present disclosure, such as the system 100 of FIG. 1, may be utilized in reverse order, such that an item could be delivered from the customer 150 to the marketplace 110 (e.g., to return an item to the marketplace or a vendor, a merchant or a manufacturer for any reason) through one or more intervening waypoints 120, 130, 140.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "marketplace," or like terms, may refer to any entity or individual that sells or otherwise makes items available for purchase, rent, lease or borrowing using one or more computer systems, as well as the associated computer systems operated or controlled by such a marketplace. Except where otherwise explicitly or implicitly indicated herein, the terms "vendor," "merchant" or "manufacturer," or like terms, may refer to any entity or individual that obtains or creates items to be sold or otherwise made available at a marketplace, as well as the associated computer systems operated or controlled by a vendor, a merchant or a manufacturer, respectively.

Except where otherwise explicitly or implicitly indicated herein, the term "waypoint" may refer to any designated location at which an item may be positioned or through which an item may travel during the transportation of the item, including an origin (e.g., a marketplace), a destination (e.g., a customer), and any specified intervening locations.

Except where otherwise explicitly or implicitly indicated herein, the terms "user," "customer," "consumer" or "user," or like terms, may refer to any entity or individual that wishes to purchase, rent, lease, borrow, or otherwise obtain items from a marketplace, as well as the associated computer systems operated or controlled by a customer, a consumer or a user, respectively.

Thus, process steps described as being performed by a "marketplace," a "vendor," a "merchant," a "manufacturer," a "waypoint," a "user," a "customer" or a "consumer" may be automated steps performed by their respective computer systems or devices, or implemented within software modules (or computer programs) executed by one or more computer systems or devices. For example, the web browser (or user interface) 154 may be implemented on the computer 152 using one or more software applications, while other programs for connecting with the Internet 160 or the GPS 170 components may be implemented by waypoints 120, 130, 140 and/or on tracking devices 122, 132, 142 using one or more software applications. Specially designed hardware could, alternatively, be used to perform certain operations. Moreover, process steps described as being performed by a "waypoint" are typically performed by a human operator and/or via a tracking device 122, 132, 142, but could, alternatively, be performed by automated agents. Similarly, process steps described as being performed by a "customer," a "consumer" or a "user" are also typically performed by a human operator via the computer 152, but could, alternatively, be performed by an automated agent.

The customer 150 may use any web-enabled or Internet applications, such as the web browser 154, or any other client-server applications or features including electronic mail (or E-mail), or other messaging techniques to communicate with (or connect to) the marketplace web site 114 and/or server 112 through the communications network 160, or with or two waypoints 120, 130, 140 and/or tracking devices 122, 132, 142, such as short or multimedia messaging service (SMS or MMS) text messages. In addition, the computer 152 may be any of a number of computing devices that are capable of communicating over the network, including but not limited to set-top boxes, personal digital assistants, mobile phones including "smart" phones, digital media players, web pads, tablet computers, laptop computers, desktop computers, electronic book readers, and the like. The protocols and components for providing communication between the marketplace server 112 and/or web site 114, the waypoints 120, 130, 140 and/or the tracking devices 122, 132, 142, and the customer computer 152 and/or web browser 154, are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the marketplace server 112, the waypoints 120, 130, 140 and/or the tracking devices 122, 132, 142, and/or the customer computer 152, and having sequences of instructions which, when executed by a processor (such as a central processing unit, or CPU), cause the processor to perform all or a portion of the functions and/or methods described herein. Such computer executable instructions, programs, software and the like may be loaded into the memory of the marketplace server 112, the tracking devices 122, 132, 142 and/or the customer computer 152 using a drive mechanism associated with the computer readable medium, such as a floppy drive, CD-ROM drive, DVD-ROM drive, network interface, or the like, or via external connections.

The present disclosure is generally directed to systems and methods for planning, maintaining and/or altering the environmental conditions of one or more items in storage or in transit, subject to one or more dynamic requirements. Preferably, the systems and methods are directed to rotating the positioning and/or alignment of one or more items in transit on a static, station-to-station basis (i.e., developing a plan to determine one or more conditions of one or more items at a waypoint, and alter the conditions, as necessary, in accordance with the plan) or a dynamic, real-time basis (i.e., where the conditions of the one or more items are monitored continuously and altered, as necessary, when needed).

For purposes of illustration, the systems and methods described herein may be referenced primarily in the context of transporting one or more items from an origin to a destination through one or more intervening waypoints, such as the system 100 shown in FIG. 1, wherein the items are purchased from an online marketplace and delivered to one or more customers. Moreover, the systems and methods described herein may be referenced primarily in regard to containers of a rectangular solid shape, with one or more faces or sides that are perpendicular to one another. As will be recognized by those of skill in the art, however, the systems and methods disclosed herein may also be used in many other situations in which the preferred or mandatory environmental conditions of an item include one or more dynamic requirements.

Figure 2:
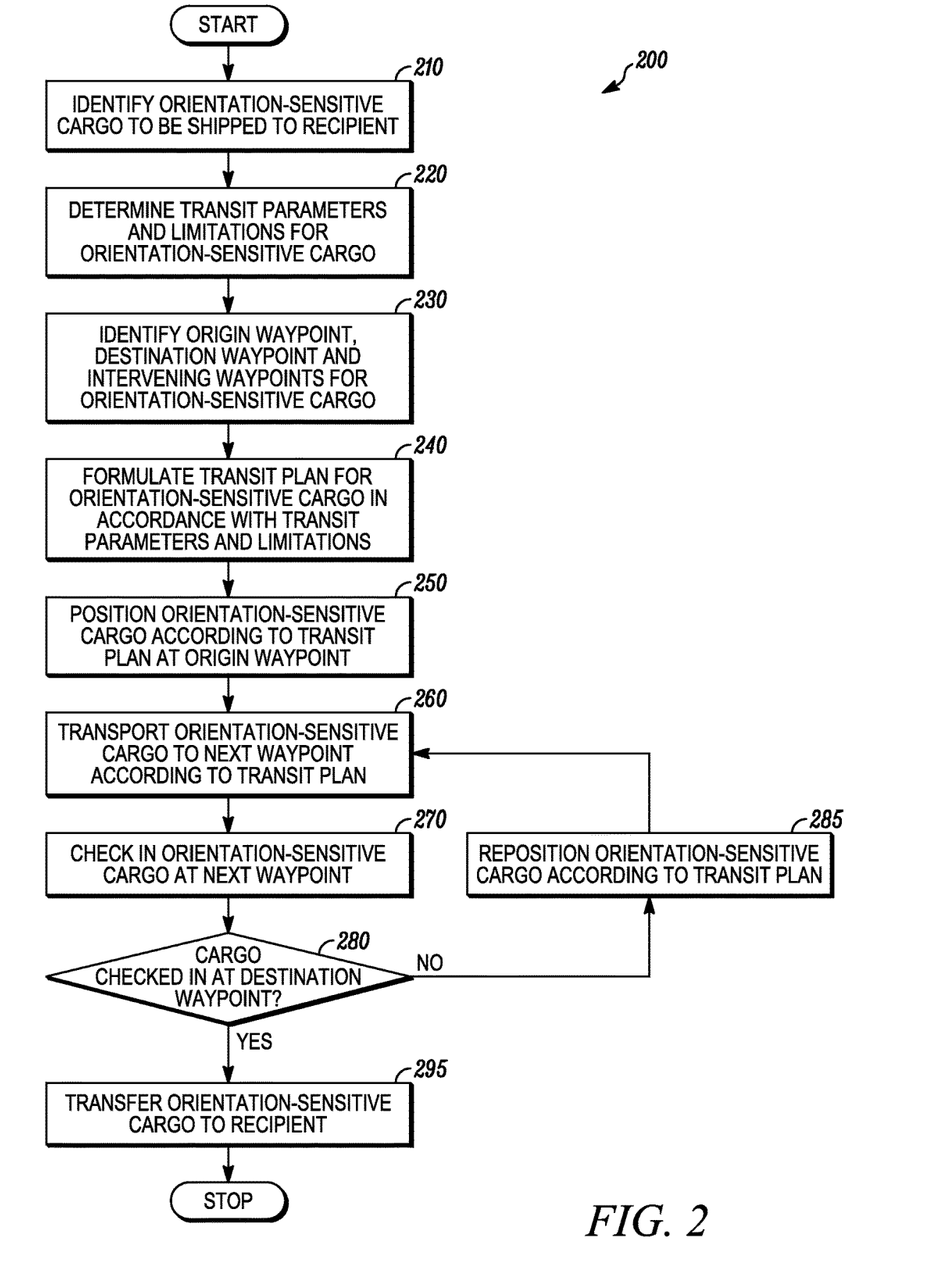
FIG. 2 is a flow chart of a method for dynamically generating orientation information for containers, in accordance with embodiments of the present disclosure.

Referring to FIG. 2, a flow chart 200 representing one embodiment of a method for dynamically generating orientation information according to the present disclosure is shown. At step 210, a set of orientation-sensitive cargo to be shipped to a recipient is identified, and at step 220, any transit parameters and/or limitations for the orientation-sensitive cargo are determined. For example, where a bushel of perishable goods is identified as having been ordered from an online marketplace by a customer, any specific, dynamic requirements (e.g., requirements that the positioning or the orientation of the goods be rotated or otherwise changed from time to time) may be identified.

At step 230, an origin waypoint, a destination waypoint, and any intervening waypoints for the delivery of the orientation-sensitive cargo to the recipient may be identified. For example, where cargo is to be delivered from a warehouse associated with an online marketplace to the recipient's home, a route for delivering the cargo through one or more automotive, rail, sea or air means at specified times and on specified dates may be determined.

At step 240, a transit plan that accommodates the various restrictions or requirements of the orientation-sensitive cargo in transit is developed. The transit plan may take into account the various parameters and/or limitations with respect to the cargo which were identified at step 220, and the various waypoints through which the cargo must travel which were identified at step 230. At step 250, the orientation-sensitive cargo may be checked in at the origin waypoint and positioned according to the transit plan. For example, the cargo may be checked in any methods or means, such as by recording the presence of the cargo at the origin waypoint or by scanning one or more sensors or optically readable markings on the container at the origin waypoint, and the transit plan may call for positioning a rectangular solid container including the cargo on one of the container's sides or faces at the origin waypoint.

At step 260, the orientation-sensitive cargo is transported to the next waypoint and, at step 270, is checked in there. At step 280, the system determines whether the waypoint at which the cargo has been checked in is the destination waypoint. If the waypoint at which the cargo has been checked in is not the destination waypoint, then the process advances to step 285, where the orientation-sensitive cargo is repositioned according to the transit plan, and returns to step 260, where the cargo is transported to the next waypoint. If the waypoint is the destination waypoint, then the process advances to step 295, and the orientation-sensitive cargo is transferred to the recipient.

Accordingly, the systems and methods of the present disclosure may systematically develop a plan to transport at least one item from an origin waypoint to a destination waypoint, and through any intervening waypoints, while maintaining the at least one item in accordance with predetermined quality requirements and/or constraints which may change from time to time as the at least one item is transported, and altering the conditions of the one or more items at each of the waypoints in accordance with the plan, and consistent with the predetermined quality requirements and/or constraints.

Figure 3A:
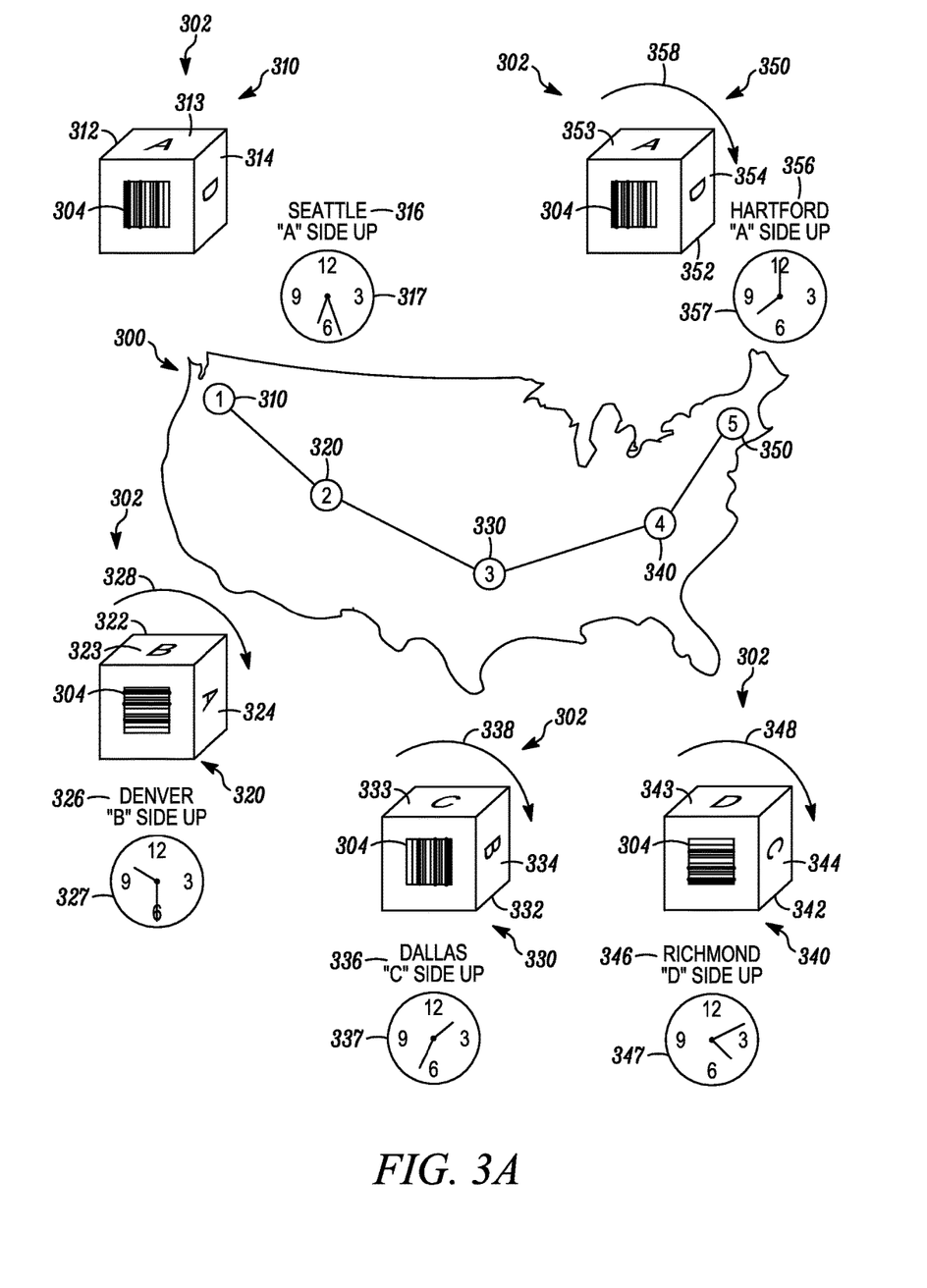
FIG. 3A is a flow diagram of a system for dynamically generating orientation information for containers, in accordance with embodiments of the present disclosure.

A transit plan generated according to an embodiment of the systems and methods of the present disclosure, such as the method represented by the flow chart 200 of FIG. 2, may take into account any inherent limitations or constraints of the cargo being shipped, as well as the routes that the cargo will follow as it is delivered from the origin to the destination through one or more intervening waypoints. Referring to FIG. 3A, one embodiment of a transit plan 300 is shown. The transit plan 300 provides for the delivery of an item 302 from an origin waypoint 310 in Seattle to a destination waypoint 350 in Hartford, through intervening waypoints 320, 330, 340 in Denver, Dallas and Richmond, respectively, and the repositioning of the item 302 at each waypoint to maximize the quality of the item upon its arrival at the destination waypoint 350.

As is shown in FIG. 3A, the item 302 is registered or otherwise checked in at the origin waypoint 310. The item 302 includes a bar code 304 on one face and, according to one embodiment of the present invention, may be checked in at the origin waypoint 310 by optically scanning the bar code 304 using one or more scanning devices. Any other method or means for registering the item 302 at a location known to those of ordinary skill in the art may be utilized in accordance with the present invention.

Once the item 302 has been checked in at the origin waypoint 310, an instruction 316 to position the item 302 in accordance with the transit plan 300 may be provided at time 317. As is shown in FIG. 3A, the item 302 is positioned in an orientation 312, in which face 313 (Side "A") is pointing vertically upward, and face 314 (Side "D") is pointed horizontally to one side, before transporting the item 302 to the waypoint 320.

At the waypoint 320, the item 302 may be checked in again, such as by scanning the bar code 304 once the item 302 has arrived at the waypoint 320. Upon checking in the item 302 at the waypoint 320, an instruction 326 to reposition the item 302 in accordance with the transit plan 300 may be provided. Specifically, as is shown in FIG. 3A, and in accordance with the transit plan 300, the item 302 may be rotated 328 to orientation 322 at waypoint 320, such that face 323 (Side "B") is pointing vertically upward, and face 324 (Side "A") is pointed horizontally to one side, before transporting the item 302 to the waypoint 330.

Similarly, upon checking the item 302 in at waypoint 330, an instruction 336 to reposition the item 302 in accordance with the transit plan 300 at time 337 may be provided. As is shown in FIG. 3A, and in accordance with the transit plan 300, the item 302 may be rotated 338 to orientation 332 at waypoint 330, such that the face 333 (Side "C") is pointing vertically upward, and face 334 (Side "B") is pointed horizontally to one side, before transporting the item 302 to the waypoint 340. Finally, upon checking the item 302 in at waypoint 340, an instruction 346 to reposition the item 302 in accordance with the transit plan 300 at time 347 may be provided. As is shown in FIG. 3A, and in accordance with the transit plan 300, the item 302 may be rotated 348 to orientation 342 at waypoint 340, such that the face 343 (Side "D") is pointing vertically upward, and face 344 (Side "C") is pointed horizontally to one side, before transporting the item 302 to the waypoint 350.

Once the item 302 is checked in at the destination waypoint 350, an instruction 356 to reposition the item 302 in accordance with the transit plan 300 at time 357 may be provided. Item 302 may be rotated 358 to orientation 352, which coincides with orientation 312 at waypoint 310, such that the face 353 (Side "A") is pointing vertically upward, and the face 354 (Side "D") is pointed horizontally to one side, before transporting the item 302 to the recipient.

Accordingly, and as is shown in FIG. 3A, the environmental conditions of an item may be changed at each waypoint of the delivery route, in accordance with a transit plan formulated in accordance with the systems and methods of the present disclosure. Specifically, with regard to the transit plan 300 shown in FIG. 3A, the orientation of the item 302 may be changed at each of the waypoints in order to distribute the amount of time for which the item 302 is positioned on any one side or face over each of the sides or faces of the item 302.

Figure 3B:
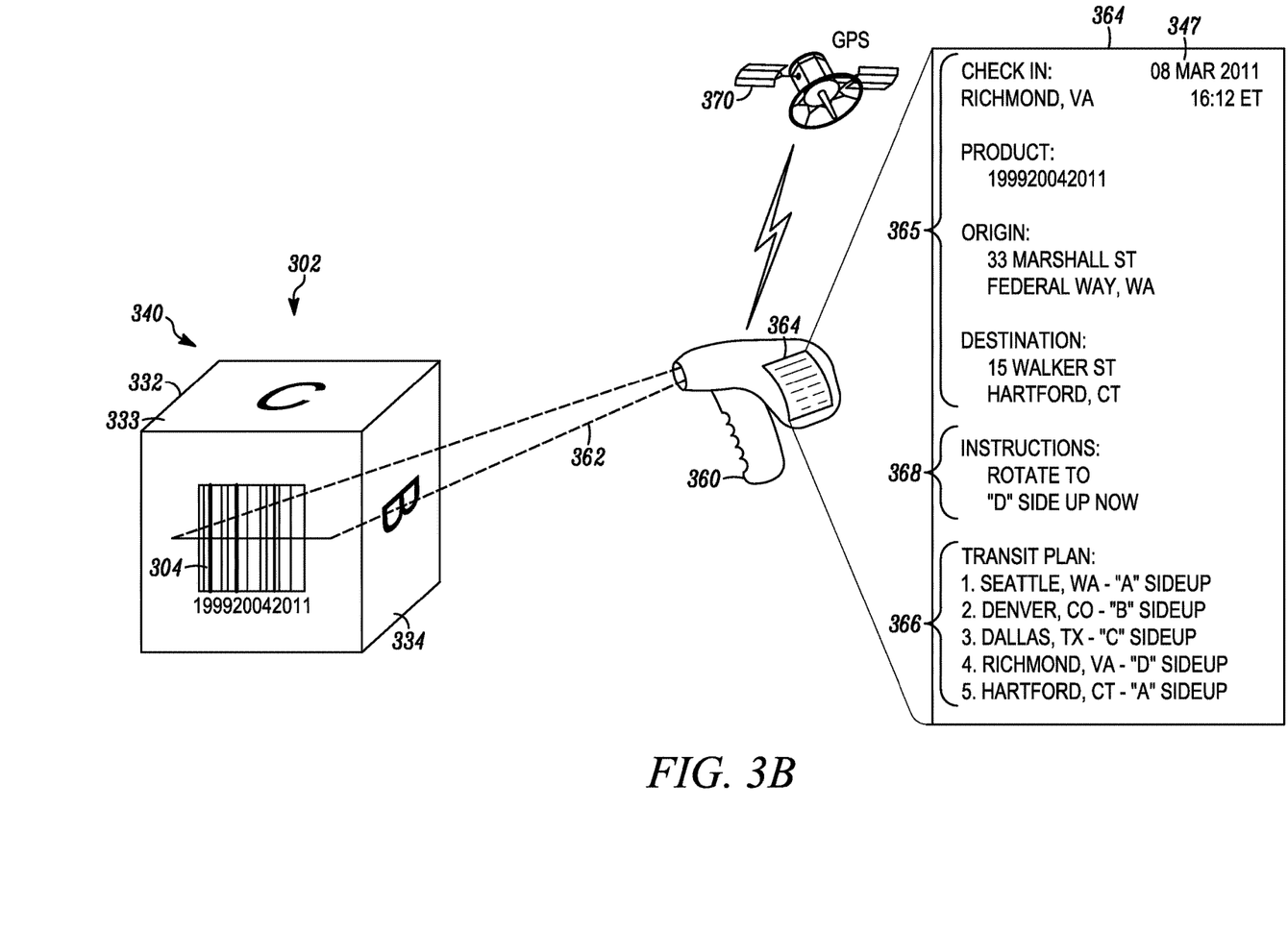
FIG. 3B is a diagram of components of a method and system for dynamically generating orientation information for containers, in accordance with embodiments of the present disclosure.

An item may be registered or otherwise "checked in" at a waypoint by any means. Referring to FIG. 3B, the item 302 of FIG. 3A is shown as being checked in upon its arrival at waypoint 340, through the use of a handheld scanner 360.

As is shown in FIG. 3B, the item 302 is shown in the orientation 332 in which it was positioned at waypoint 330, as is shown in FIG. 3A, upon its arrival at waypoint 340. Specifically, as is shown in FIG. 3A, prior to its departure from the waypoint 330, the item 302 was positioned in orientation 332, such that face 333 (Side "C") was pointed vertically upward, and face 334 (Side "B") was pointed horizontally to one side. As is shown in FIG. 3B, upon the arrival of the item 302 at waypoint 340, the bar code 304 on one side of the item 302 may be scanned with a handheld scanner 360, which emits a series of light beams 362 onto the bar code 304. The scanner 360 then measures the intensity of any light reflected from the bar code 304 in one or more frequencies and generates a signal corresponding to the item 302, based on the measured intensities. The scanner 360 also communicates with one or more Global Positioning System (GPS) components 370 to determine the location of the scanner 360, which is presumed to be the location of the item 302 at the time 347 at which the item 302 is registered or checked in at the waypoint 340.

Information regarding the item 302 and the transit plan 300 may be displayed on one or more screens or displays on the handheld scanner 360. As is shown in FIG. 3B, once the bar code 304 has been read by the scanner 360, and the position of the scanner 360 has been confirmed, information 365 regarding the item 302, the time 347 at which the item 302 was scanned, a summary 366 of the transit plan 300, and instructions 368 for positioning the item 302 may be displayed on the display 364.

Figure 4:
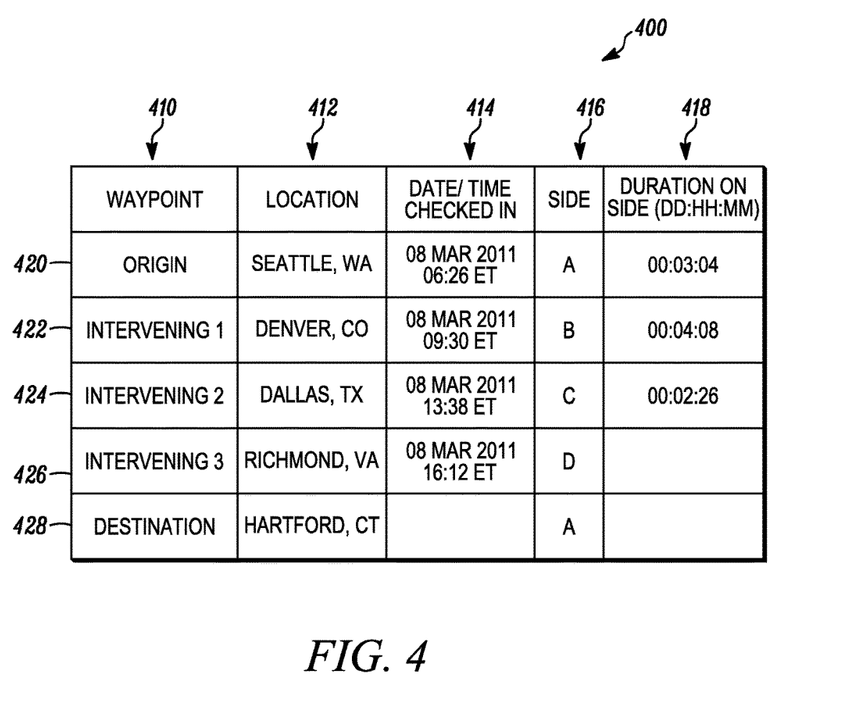
FIG. 4 is an array of information associated with a system and method for dynamically generating orientation information for containers, in accordance with embodiments of the present disclosure.

Data regarding the delivery of an item according to a transit plan, such as the transit plan 300 shown in FIG. 3A, may be recorded or maintained in one or more tables or arrays, and stored in a data base or other data store. Referring to FIG. 4, a table 400 containing data regarding the delivery of an item from an origin to a destination. The data in the table 400 of FIG. 4 corresponds to the transit plan 300 for the delivery of the item 302 from the origin waypoint 310 to the destination waypoint 350 through waypoints 320, 330, 340 shown in FIG. 3A, once the item 302 has been checked in at waypoint 340. The table 400 includes columns corresponding to the various waypoints 410 and their locations 412, a date and time 414 at which the item 302 was checked in at each of the waypoints, a side 416 that was facing up when the item 302 was checked in, and a duration 418 at which the item was maintained on the side. The table 400 also includes rows corresponding to each of the waypoints in the transit plan, including the origin waypoint 420, the intervening waypoints 422, 424, 426 and the destination waypoint 428.

As is shown in FIG. 4, the data in the table 400 is shown after the item 302 has been checked in at the fourth waypoint 340 at time 347 in FIG. 3A. Once the item 302 is checked in at each of the waypoints, the duration at which the item 302 was positioned with a particular side facing up is calculated (e.g., three hours and four minutes with Side "A" up, from Seattle to Denver), and a complete report of the transit conditions of the item 302 may be provided to the recipient once the item 302 has been delivered.

Pertinent information regarding the status of one item and/or its container, or a plurality of items and/or their respective containers, such as the data stored in the table 400 of FIG. 4, may be displayed in one or more user interfaces and/or stored in one or more databases or data stores in accordance with the systems and methods of the present disclosure. For example, such a user interface may display the current, respective orientations of the items and/or their containers, as well as the temperatures, pressures and/or any other characteristics or variables regarding the conditions of the items and/or their containers. Such a user interface may further display information indicative of a frequency with which containers have been delivered in accordance with a transit plan, or in compliance with one or more predetermined requirements or conditions. Additionally, computer systems utilizing one or more embodiments of the present disclosure may display one or more visual warnings or other indicia, or cause one or more alarms or other audio signals to sound, if a threshold relating to one or more requirements or conditions of the items and/or their containers has been met or exceeded. The display of such interfaces, warnings or indicia, or the sounding of such alarms or audio signals, is well known to those of ordinary skill in the pertinent art and thus, need not be described in more detail herein.

According to some embodiments of the present disclosure, the orientation of an item in transit may be monitored in a static, station-to-station format, such as according the method represented by the flow chart 200 of FIG. 2, or the transit plan 300 of FIG. 3A. In such a manner, once an item is positioned at a waypoint (i.e., positioning the item 302 in orientation 312 with Side "A" up at waypoint 310, as is shown in FIG. 3A), the orientation of that item is assumed to remain unchanged until the item 302 arrives at the next waypoint and is repositioned there. According to other embodiments of the present disclosure, however, the conditions of an item in storage or in transit may be monitored in real-time, such that the duration that the item spends in each position in three-dimensional space may be tracked and altered as and when necessary. Through the use of such embodiments, a more exact account of the orientation of the item in transit may be determined, and a more comprehensive set of data regarding the item's conditions during its delivery may be reported to the recipient upon the item's arrival at the destination. For example, where a sensor including a gyroscope or other like device is affixed or mounted to an item in transit and monitored in real-time, the systems and methods of the present disclosure may precisely determine the amounts of time for which an item has been positioned in one or more orientations.

Figure 5:
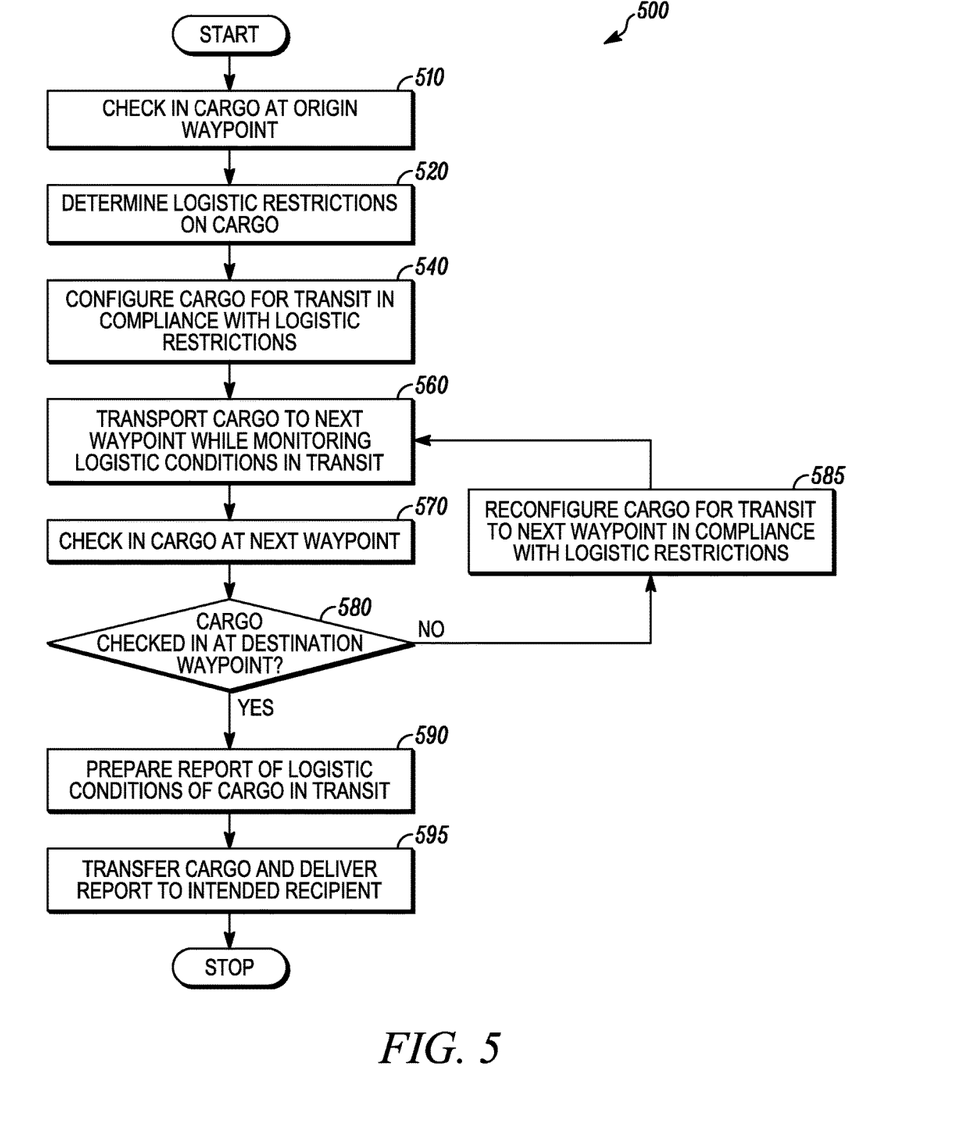
FIG. 5 is a flow chart of a method for dynamically generating orientation information for containers, in accordance with embodiments of the present disclosure.

Referring to FIG. 5, a flow chart 500 representing one embodiment of a method for dynamically generating orientation information for a container according to the present disclosure is shown. Except where otherwise noted, reference numerals preceded by the number "5" in FIG. 5 indicate steps that are similar to steps having reference numerals preceded by the number "2" shown in FIG. 2.

At step 510, a set of cargo is checked in at the origin waypoint, and at step 520, any logistic restrictions associated with the cargo are determined. For example, at the origin waypoint, a bar code or radio frequency identification (RFID) device affixed to or otherwise associated with the cargo may be scanned to identify the set of cargo, and, once the cargo has been identified, any logistic restrictions on the cargo may be obtained over the Internet or from one or more local databases. For example, such logistic restrictions may include limits on the amount of time that the cargo is positioned on a particular side or subjected to a particular temperature or pressure.

At step 540, the cargo is configured for transit in compliance with the logistic restrictions determined at step 520. For example, if the logistic conditions require the cargo to be delivered in a particular orientation or at a particular temperature or pressure, the cargo may be mounted in a container and/or vessel for transportation to the next waypoint, and the container and/or vessel may be positioned in the particular orientation or maintained at the appropriate temperature or pressure. At step 560, the cargo may be transported to the next waypoint while the logistic conditions of the cargo are monitored in transit.

At step 570, the cargo may be checked in at the next waypoint, and, at step 580, if the waypoint at which the cargo is checked in is the destination waypoint, a report of the logistic conditions of the item in transit may be prepared at step 590, and the cargo and the report may be provided to the recipient at step 595. If the waypoint at which the cargo is checked in is not the destination waypoint, then the cargo may be reconfigured for transit to the next waypoint at step 585, and the process may return to step 560. For example, the container and/or vessel in which the cargo is stored may be repositioned to a different orientation, or the temperature or pressure of the container and/or vessel may be changed, before transporting the container and/or vessel to the next waypoint.

Figure 6:
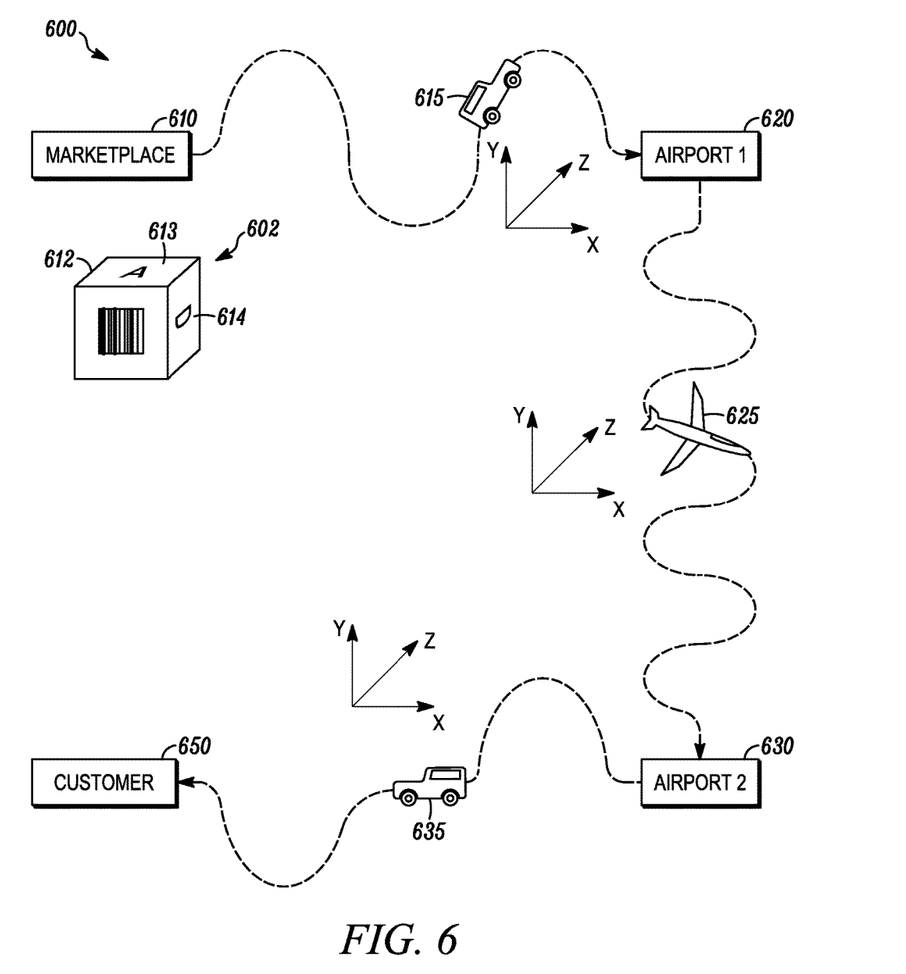
FIG. 6 is a flow diagram of a system for dynamically generating orientation information for containers, in accordance with embodiments of the present disclosure.

As is set forth above, the systems and methods of the present disclosure may monitor the conditions of an item in transit from an origin waypoint (e.g., a marketplace) to a destination waypoint (e.g., a customer) through one or more intervening waypoints. Referring to FIG. 6, a flow diagram of a system 600 for dynamically generating orientation information for containers in accordance with the present disclosure is shown. The system 600 shows the delivery of an item 602 having a bar code 604 from a marketplace 610 in a truck 615 to a first airport 620, and then from the first airport 620 to a second airport 630 in an airplane 625, and finally in a truck 635 from the second airport 630 to the customer 650. As is shown in FIG. 6, the item 602 may be positioned in any number of orientations with respect to the x-axis, y-axis and z-axis, as the item 602 is transported from the marketplace 610 to the customer as shown, within the truck 615, the airplane 625 and/or the truck 635. Once the item 602 arrives at each of the waypoints 610, 620, 630, 650, the bar code 604 may be scanned, and the environmental conditions of the item 602 may be changed, as necessary, to conform to any particular restrictions or requirements, which may be monitored continuously as the item 302 is transported from the marketplace 610 to the customer 650.

Figure 7A:
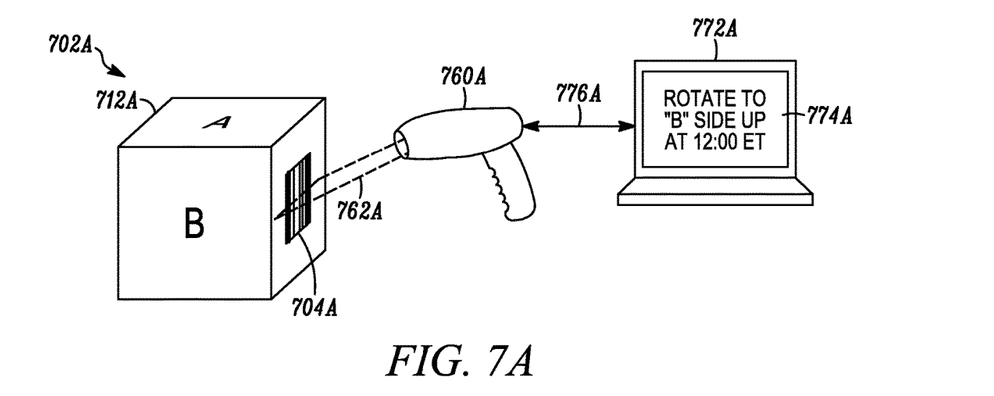
FIGS. 7A, 7B and 7C show arrangements of components of a method and system for dynamically generating orientation information for containers, in accordance with embodiments of the present disclosure.

Additionally, the environmental conditions of one or more containers may be registered, checked in, determined and/or monitored using any appropriate system in accordance with the systems and methods of the present disclosure. Referring to FIG. 7A, an item 702A having a bar code 704A is shown as being checked in using a wireless handheld scanner 760A. The item 702A is shown in an orientation 712A, with the handheld scanner 760A projecting a series of light beams 762A onto the bar code 704A. The scanner 760A then reads the intensities of light reflected from the bar code 704A and transmits a signal 776A corresponding to the item 702A to a computer 772A, which displays information 774A regarding the status of the item 702A. For example, as is shown in FIG. 7A, the computer 772A indicates that the item 702A should be rotated such that Side "B" is up at a particular time. The scanner 760A and/or the computer 772A may be linked to the Internet or a positioning system, such as one or more Global Positioning System (GPS) components.

Figure 7B:
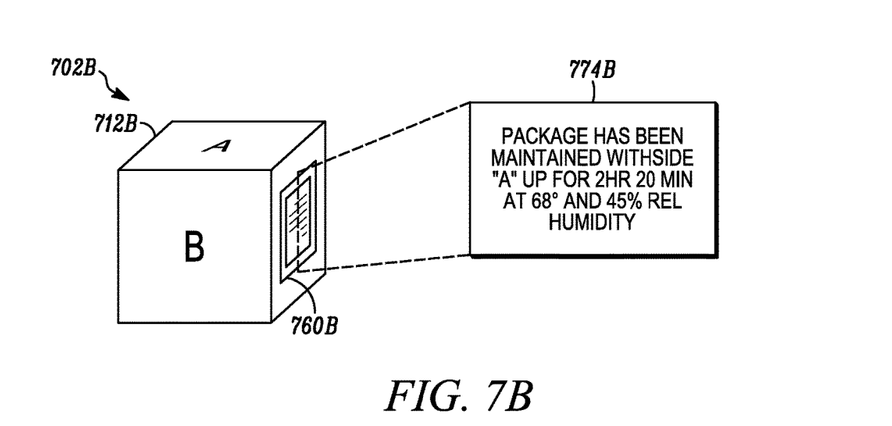

Referring to FIG. 7B, an item 702B is shown in an orientation 712B, and having a computer device 760B mounted directly to the item 702B. The computer device 760B may be a tablet computer or mini-computer, or like device, that displays information 774B indicating that the package has been maintained with a particular side up and at a certain temperature and humidity level for a certain period of time. For example, the computer device 760B may include or be connected with at least one sensor (e.g., a gyroscope, an accelerometer, or a thermometer) and connected to the Internet or a positioning system, such as one or more GPS components.

Figure 7C:
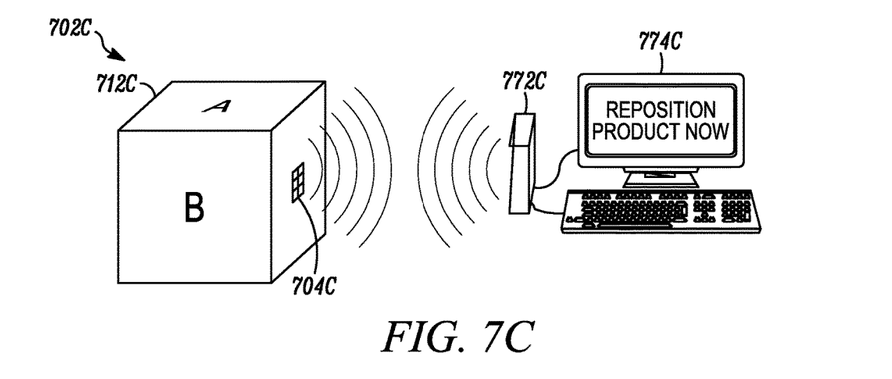

Referring to FIG. 7C, an item 702C is shown in an orientation 712C, and having a wireless transmitter 704C, such as a radio-frequency identification (RFID) device, in wireless communication with a computer 772C. The computer 772C displays information 774C indicating that the product should be repositioned now. In such a manner, the wireless transmitter 704C may include or be connected with at least one sensor, and may transit information regarding one or more conditions of the container to the computer 772C, which may be connected to the Internet or a positioning system, such as one or more GPS components.

Devices including combinations of one or more of the features shown in FIGS. 7A, 7B and 7C may also be utilized for registering or checking in, determining and/or monitoring the environmental conditions of one or more items, in accordance with the systems and methods of the present disclosure.

Figure 8:
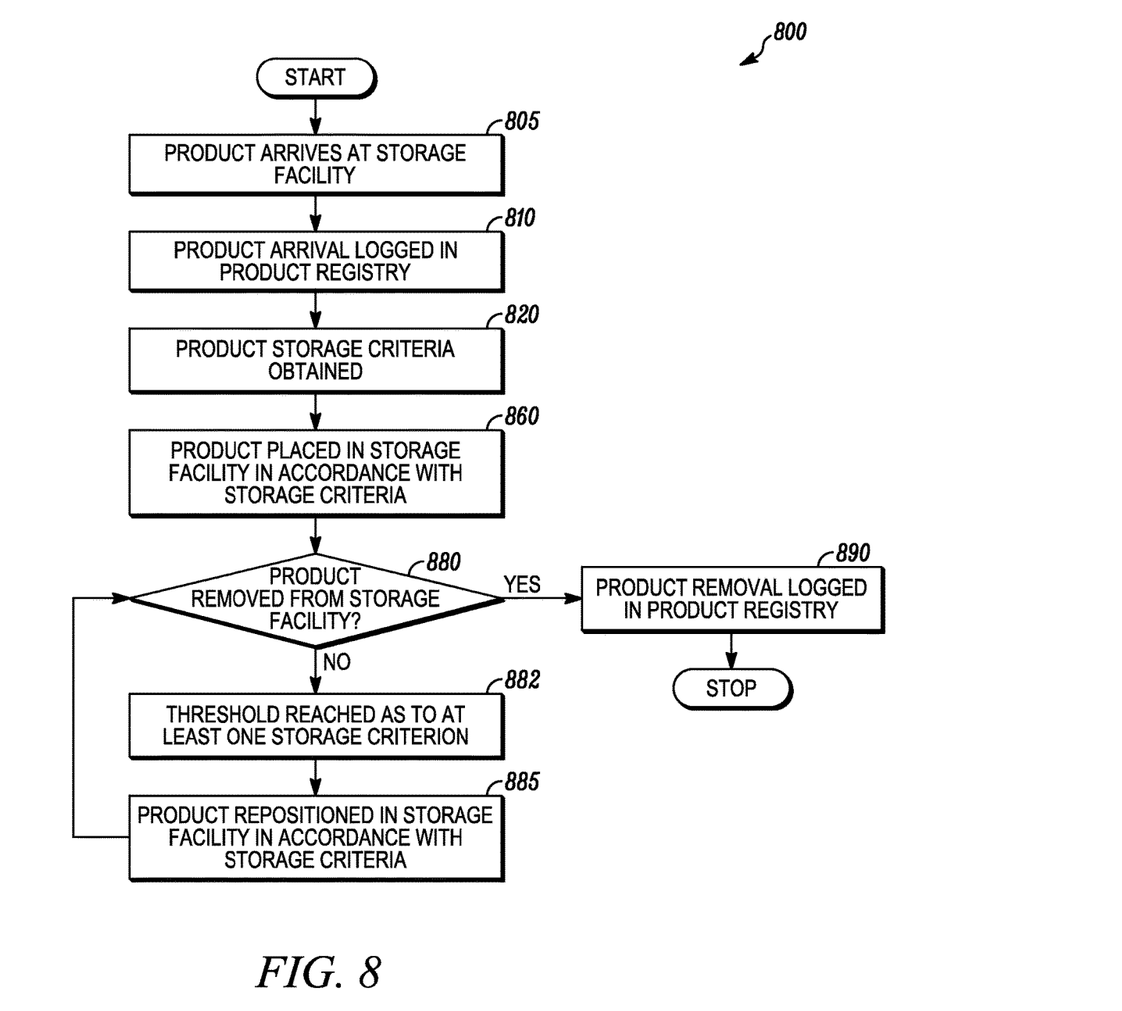
FIG. 8 is a flow chart of a method for dynamically generating orientation information for containers, in accordance with embodiments of the present disclosure.

As is discussed above, the systems and methods of the present disclosure may also be used for planning, maintaining and/or altering the environmental conditions of one or more items that are not only in transit but also in storage, such as in a warehouse or like facility. Referring to FIG. 8, a flow chart 800 representing one embodiment of a method for dynamically generating orientation information for a container according to the present disclosure is shown. Except where otherwise noted, reference numerals preceded by the number "8" in FIG. 8 indicate steps that are similar to steps having reference numerals preceded by the number "2" shown in FIG. 2, or by the number "5" shown in FIG. 5.

At step 805, a product arrives at a storage facility, and at step 810, the arrival of the product is logged into a product registry. For example, where a product arrives at a warehouse, the product and any pertinent information regarding the product may be logged in one or more computer systems, such as using a scanner or other device. At step 820, a set of product storage criteria is obtained. For example, where the product is identified and logged at step 810, information such as the shelf life or any particular storage considerations may be obtained from a local database or data store, or from one or more databases or data stores connected to the Internet or another network.

At step 860, the product is placed in the storage facility in accordance with the storage criteria. For example, where an item must be stored in a particular orientation, the item is placed or installed on a shelf or other like facility in the particular orientation as required. Where an item must be maintained at a particular temperature, the item is placed in a portion of the storage facility that is maintained at the appropriate temperature. At step 880, from time to time, the system determines whether the product has been removed from the storage facility. If the product remains in the storage facility, then at step 882, when a threshold has been reached as to at least one storage criterion, the product is repositioned in the storage facility in accordance with the at least one storage criteria at step 885. If the product is removed from the storage facility, then the removal of the product is logged in the product registry, and the process ends.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. While the present disclosure describes exemplary embodiments that may be associated with shipments of items from online marketplaces to customers or utilized in warehouses, the systems and methods of the present disclosure are not so limited, and may be utilized in connection with any systems or methods for storing or delivering items.

For example, although many of the embodiments disclosed herein describe the rotation of a rectangular solid container within a single plane (i.e., rotating the container in rotations of approximately ninety degrees each, from a first side of the container to a second side of the container, where the sides of the container are perpendicular to one another), the systems and methods of the present disclosure are not limited to such rotations. Containers having any shape (i.e., not only rectangular solids, such as cubes, but also pyramids, cylinders, cones, spheres or any other shape) may be rotated at any angle (i.e., thirty degrees, sixty degrees, or any other rotation) and among any number of sides or with respect to any axis or plane (i.e., among each of the six sides of a rectangular solid container) in accordance with the present disclosure.

Moreover, although many of the embodiments disclosed herein refer to a "transit plan" for planning, maintaining and/or altering the conditions of items in transit, the systems and methods of the present disclosure are not so limited. For example, the systems and methods may be used to develop a "storage plan" for planning, maintaining and/or altering the conditions of items in storage, or any other like plan for implementing one or more of the systems or methods disclosed herein. Furthermore, the systems and methods of the present disclosure are not limited to planning, maintaining and/or altering the alignment or orientation of a container or the items stored or transported therein. As those of ordinary skill in the art would understand in view of the present disclosure, the systems and methods described herein may be utilized to plan, maintain and/or alter any environmental condition of a container or one or more items, including but not limited to the temperature of the container or items, the pressure of the container or items, or any other condition.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-implemented method comprising:
identifying a container holding a plurality of goods;
identifying at least one orientation requirement associated with at least one of the goods using at least one computer processor;
formulating a transit plan for transporting the container in accordance with the at least one orientation requirement using the at least one computer processor, wherein the transit plan defines a plurality of orientations for the container, and wherein each of the plurality of orientations corresponds to at least one of a plurality of waypoints;
registering the container at a first waypoint using the at least one computer processor;
generating at least one instruction for positioning the container in a first orientation at the first waypoint in accordance with the transit plan;
causing a display of information regarding the at least one instruction for positioning the container in the first orientation on at least one computer display at the first waypoint using the at least one computer processor;
causing the container to be transported from the first waypoint to a second waypoint in accordance with the transit plan using the at least one computer processor;
registering the container at the second waypoint using the at least one computer processor;
generating at least one instruction for positioning the container in a second orientation at the second waypoint in accordance with the transit plan; and
causing a display of information regarding the at least one instruction for positioning the container in the second orientation on at least one computer display at the second waypoint using the at least one computer processor.

2. The computer-implemented method of claim 1,
wherein the container comprises an optical machine-readable marking thereon, and
wherein registering the container at the second waypoint further comprises:
scanning the optical machine-readable marking using a reader;
determining a location of the reader;
determining whether the location of the reader corresponds to a location of the second waypoint; and
upon determining that the location of the reader corresponds to the location of the second waypoint,
causing the display of the information regarding the at least one instruction for positioning the container in the second orientation on the at least one computer display at the second waypoint using the at least one computer processor.

3. The computer-implemented method of claim 1, further comprising:
causing the container to be transported from the second waypoint to a third waypoint in accordance with the transit plan using the at least one computer processor; and
registering the container at the third waypoint using the at least one computer processor.

4. A computer-implemented method for transporting cargo from an origin waypoint to a destination waypoint through a plurality of intervening waypoints, the method comprising:
identifying information regarding the cargo to be transported using at least one computer processor;
determining at least one transportation restriction for the cargo based at least in part on the information regarding the cargo using the at least one computer processor, wherein the at least one transportation restriction relates, at least in part, to an orientation of the cargo;
developing a transit plan for transporting the cargo in compliance with the at least one transportation restriction using the at least one computer processor;
positioning a container holding the cargo in a first orientation at the origin waypoint in accordance with the transit plan;
transporting the container from the origin waypoint to a first one of the plurality of intervening waypoints; and
positioning the container in a second orientation at the first one of the plurality of intervening waypoints in accordance with the transit plan.

5. The computer-implemented method of claim 4, further comprising:
transporting the container from the first one of the plurality of intervening waypoints to a second one of the plurality of intervening waypoints; and
positioning the container in a third orientation at the second one of the plurality of intervening waypoints.

6. The computer-implemented method of claim 4, wherein the container comprises an optically readable bar code, and
wherein the method further comprises:
scanning the optically readable bar code using a reader at the first one of the plurality of intervening waypoints.

7. The computer-implemented method of claim 6, further comprising:

causing a display of an instruction for positioning the container in the second orientation at the first one of the plurality of intervening waypoints on at least one computer display.

8. The computer-implemented method of claim 6, wherein the method further comprises:
determining a location of the reader; and
upon determining the location of the reader is consistent with a location of the first one of the plurality of intervening waypoints,
generating an instruction to position the container in the second orientation.

9. The computer-implemented method of claim 4, wherein the container comprises a sensor associated with a radio frequency identification device, and
wherein the method further comprises:
receiving a signal from the radio frequency identification device at the first one of the plurality of intervening waypoints,
wherein the signal comprises data obtained from the sensor regarding at least one condition of the cargo with respect to the at least one transportation restriction.

10. The computer-implemented method of claim 4, wherein developing the transit plan for transporting the cargo in compliance with the at least one transportation restriction further comprises:
determining a route for transporting the cargo from the origin waypoint to the destination waypoint through the plurality of intervening waypoints, wherein the route has a plurality of segments, and wherein each of the plurality of segments extends between two of the origin waypoint, the destination waypoint or one of the plurality of intervening waypoints; and
assigning an orientation to each of the plurality of segments of the route, wherein the first orientation is assigned to a first segment extending between the origin waypoint and the first one of the plurality of intervening waypoints, and wherein the second orientation is assigned to a second segment extending between the first one of the plurality of intervening waypoints and a second one of the plurality of intervening waypoints.

11. The computer-implemented method of claim 4, wherein at least one sensor is associated with the container, and
wherein the method further comprises:
receiving information regarding a condition of the container with respect to the at least one transportation restriction from the at least one sensor;
determining whether a threshold relating to the condition with respect to the at least one transportation restriction is met based at least in part on the information regarding the condition of the container; and
upon determining that the threshold is met or exceeded, issuing an alarm.

12. The computer-implemented method of claim 4, wherein a sensor comprising a gyroscope is mounted to the container; and
wherein the method further comprises:
receiving information regarding an angular alignment of the container from the sensor; and
selecting the second orientation based at least in part on the information regarding the angular alignment of the container.

13. The computer-implemented method of claim 4, wherein at least one of an accelerometer, a thermometer or a manometer is fixed to the container, and wherein the method further comprises:
receiving information regarding at least one of an acceleration applied to the container, a temperature of the container or a pressure of the container; and
selecting the second orientation based at least in part on the information regarding the at least one of the acceleration applied to the container, the temperature of the container or the pressure of the container.

14. The computer-implemented method of claim 4, further comprising:
determining a length of time over which the container has been positioned in the first orientation; and
selecting the second orientation based at least in part on the length of time.

15. The computer-implemented method of claim 4, wherein the container comprises at least one external marking; and
wherein the method further comprises:
confirming the positioning of the container in the first orientation in accordance with the transit plan with respect to the at least one external marking.

16. The computer-implemented method of claim 4, further comprising:
causing a display of a user interface including information regarding a plurality of containers in transit on at least one computer display, wherein the container holding the cargo is one of the plurality of containers.

17. The computer-implemented method of claim 16, wherein the information regarding the plurality of containers in transit relates to a condition of each of the plurality of containers with respect to the at least one transportation restriction.

18. A computer system comprising:
a computer having at least one computer processor;
a first scanning device; and
a second scanning device,
wherein the computer is adapted to execute a computer program causing the computer system to perform a method comprising the steps of:
developing a transit plan for a delivery of a container using the at least one computer processor, wherein the transit plan associates a plurality of orientations of the container with a plurality of locations of the container;
determining a location of the first scanning device;
registering the container with the first scanning device;
positioning the container in a first orientation associated with the location of the first scanning device in accordance with the transit plan;
determining a location of the second scanning device;
registering the container with the second scanning device; and
positioning the container in a second orientation associated with the location of the second scanning device in accordance with the transit plan.

19. The computer system of claim 18, wherein the container comprises an optically readable marking, and
wherein registering the container with the first scanning device further comprises reading the optically readable marking using the first scanning device.

20. The computer system of claim 18, further comprising:
determining the first orientation based on the location of the first scanning device.

21. The computer system of claim 18, further comprising:
determining the second orientation based at least in part on at least one of the location of the second scanning device or a length of time over which the container was positioned in the first orientation.

22. A computer-implemented method for shipping a container of goods from an origin to a destination, comprising:
    establishing a first condition of the container at the origin in accordance with at least one restriction, wherein the container comprises a sensor for monitoring a status of the container with respect to the at least one restriction, wherein the first condition of the container comprises a first angular orientation of the container, and wherein the at least one restriction comprises a time during which the container is in the first angular orientation;
    receiving information regarding the status of the container with respect to the at least one restriction from the sensor;
    determining whether a threshold regarding the at least one restriction has been met or exceeded based at least in part on the information regarding the status of the container with respect to the at least one restriction received from the sensor; and
    upon determining that the threshold regarding the at least one restriction has been met or exceeded,
        altering the status of the container with respect to the at least one restriction.

23. The computer-implemented method of claim 22, wherein altering the status of the container further comprises:
    confirming a location of the container at a first intervening waypoint between the origin and the destination; and
    establishing a second condition of the container at the first intervening waypoint in accordance with the at least one restriction.

* * * * *